United States Patent
Chendamarai Kannan et al.

(10) Patent No.: US 10,581,572 B2
(45) Date of Patent: Mar. 3, 2020

(54) AUTONOMOUS UPLINK TRANSMISSIONS ON A SHARED COMMUNICATION MEDIUM

(71) Applicant: QUALCOMM Incorporated, San Diego, CA (US)

(72) Inventors: Arumugam Chendamarai Kannan, San Diego, CA (US); Chirag Sureshbhai Patel, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/839,826

(22) Filed: Dec. 12, 2017

(65) Prior Publication Data

US 2018/0175986 A1 Jun. 21, 2018

Related U.S. Application Data

(60) Provisional application No. 62/435,604, filed on Dec. 16, 2016.

(51) Int. Cl.
*H04L 5/00* (2006.01)
*H04W 74/08* (2009.01)
(Continued)

(52) U.S. Cl.
CPC .......... *H04L 5/0048* (2013.01); *H04W 72/042* (2013.01); *H04W 74/08* (2013.01);
(Continued)

(58) Field of Classification Search
CPC ..... H04L 5/0048; H04L 5/005; H04L 5/0053; H04L 5/0055; H04L 5/0057; H04L 5/001;
(Continued)

(56) References Cited

U.S. PATENT DOCUMENTS

2016/0302230 A1* 10/2016 Novlan ................ H04B 17/318
2017/0019909 A1* 1/2017 Si ........................... H04L 47/27
(Continued)

FOREIGN PATENT DOCUMENTS

WO WO 2013024346 A1 * 2/2013 ........ H04W 56/0045
WO 2017097725 A1 6/2017
WO 2017133270 A1 8/2017

OTHER PUBLICATIONS

Partial International Search Report—PCT/US2017/066017—ISA/EPO—dated May 5, 2018.
(Continued)

*Primary Examiner* — Obaidul Huq
(74) *Attorney, Agent, or Firm* — Muncy, Geissler, Olds & Lowe, P.C.

(57) ABSTRACT

In an embodiment, an AT monitors a DMTC window of a shared communication medium while refraining from performing any AUL transmissions. The AT selectively transmits one or more AUL transmissions based on the monitoring (e.g., in response to DRS detection, either in one or more subframes of the DMTC window or outside of the DMTC window). In a further embodiment, the AT establishes different LBT contention windows for use during and outside of POWs and/or DMTC windows. In a further embodiment, the AT receives an AUL disable signal instructing the AT to disable AUL transmissions, and the AT refrains from performing one or more AUL transmissions on the shared communication medium in response to the AUL disable signal.

28 Claims, 11 Drawing Sheets

(51) Int. Cl.
*H04W 72/04* (2009.01)
*H04W 24/10* (2009.01)
*H04W 68/00* (2009.01)

(52) U.S. Cl.
CPC .......... *H04W 24/10* (2013.01); *H04W 68/005* (2013.01); *H04W 72/0446* (2013.01)

(58) Field of Classification Search
CPC ... H04W 24/10; H04W 72/042; H04W 74/08; H04W 68/005; H04W 72/0446; H04W 16/14; H04W 72/0413; H04W 74/0816; H04W 74/0808; H04W 74/085
USPC .......................................... 370/310, 328, 329
See application file for complete search history.

(56) References Cited

U.S. PATENT DOCUMENTS

| | | | |
|---|---|---|---|
| 2017/0111888 A1* | 4/2017 | Dinan | H04W 72/042 |
| 2017/0223558 A1* | 8/2017 | Deng | H04W 24/02 |
| 2017/0367110 A1* | 12/2017 | Li | H04W 72/1268 |
| 2018/0041957 A1* | 2/2018 | Xiong | H04W 72/1268 |
| 2018/0092104 A1* | 3/2018 | Sheng | H04W 72/085 |

OTHER PUBLICATIONS

CMCC: "Discussion on LAA DRS Design", 3GPP Draft; R2-153209 LAA DRS Design, 3rd Generation Partnership Droject (3GPP), Mobile Competence Centre; 650, Route Des Lucioles; F-06921 Sophia-Antipolis Cedex; France, vol. RAN WG2, No. Beijing, China; Aug. 24, 2015-Aug. 28, 2015 Aug. 23, 2015 (Aug. 23, 2015), XP051040210, Retrieved from the Internet: URL:http://www.3gpp.org/ftp/Meetings_3GPP_SYNC/RAN2/Docs/ [retrieved on Aug. 23, 2015], 4 pages.
Erisson: "On Autonomous UL Transmissions for NR in Unlicensed Spectrum", 3GPP Draft; R1-1612779, 3rd Generation Partnership Project (3GPP), Mobile Competence Centre; 650, Route Des Lucioles; F-06921 Sophia-Anti Polis Cedex; France, vol. RAN WG1, No. Reno, USA Nov. 13, 2016, XP051176721, Retrieved from the Internet URL:http://www.3gpp.org/ftp/Meetings_3GPP_SYNC/RAN1/Docs/ [retrieved on Nov. 13, 2016], 3 pages.
Ericsson: "On Channel Access for AUL", 3GPP Draft; R1-1717122, 3rd Generation Partnership Project (3GPP), Mobile Competence Centre; 650, Route Des Lucioles; F-06921 Sophia-Antipolis Cedex; France vol. RAN WG1, No. Prague, Czech Republic; Oct. 9, 2017-Oct. 13, 2017 Sep. 29, 2017, XP051351529, Retrieved from the Internet URL: http://www.3gpp.org/ftp/tsg_ran/WG1_RL1/TSGR1_90b/Docs/ [retrieved on Sep. 29, 2017], 6 pages.
Intel Corporation: "A Framework to Enable Autonomous Uplink Access", 3GPP Draft; R1-1747327, 3rd Generation Partnership Project (3GPP), Mobile Competence Centre; 650, Route Des Lucioles; F-06921 Sophia-Antipolis Cedex ; France vol. RAN WG1, No. Prague, CZ; Oct. 9, 2017-Oct. 13, 2017 Sep. 30, 2017, XP051351842, Retrieved from the Internet: URL:http://www.3gpp.org/ftp/tsg_ran/WG1_RL1TTSGR1_90b/Docs/ [retrieved on Sep. 30, 2017], 4 pages.
International Search Report and Written Opinion—PCT/US2017/066017—ISA/EPO—dated May 3, 2018.
Lucent: "Scheduled and Autonomous Mode Operation for the Enhanced Uplink", 3GPP TSG RAN Wordking GROUP1 Meeting #31, Tokyo, JP, vol. R1-03-0284, No. 31, Feb. 17, 2003, XP002491103, Retrieved from the Internet: URL:ftp://ftp.3gpp.org/TSG_RAN/WG2_RL2/TSG/R2_45bis/Docs/R2-050169.zip [retrieved on Feb, 17, 2003], pp. 1-7.
Motorola: "Management of Enhanced Uplink Scheduling Modes", 3GPP Draft; R1-03-0477, 3rd Generation Partnership Project (3GPP), Mobile Competence Centre; 650, Route Des Lucioles; F-06921 Sophia-Antipolis Cedex ; France vol. RAN WG1, No. Paris, France; May 15, 2003, May 15, 2003, XP050097504, [retrieved on May 15, 2003], 6 pages.
Nokia: "Summary of Email Discussion [90b-LTE-19] on AUL resource Allocation", 3GPP Draft; R1-1749850 Email Discussion 90b-LTE-19 Summary, 3rd Generation Partnership Project (3GPP), Mobile Competence Centre; 650, Route Des Lucioles; F-06921 Sophia-Antipolis Cedex ; France vol. RAN WG1, No. Reno, NV, US; Nov. 27, 2017-Dec. 1, 2017 Nov. 17, 2017, XP051368877, Retrieved from the Internet URL:http://www.3gpp.org/tsg_ran/WG1_RL1/TSGR1_91/Docs/R1-1719850 Email discussion 90b-LTE-19 Summary.docx [retrieved on Nov. 17, 2017], 8 pages.
NTT Docomo et al., "Views on DL LBT Mechanism and Contention Window Size Adaptation", 3GPP R1-154403 DL Channel ACCESS_FINAL, 3rd Generation Partnership Project (3GPP), Mobile Competence Centre ; 650, Route Des Lucioles ; F-06921 Sophia-Antipolis Cedex ; France vol. Ran WG1, No. Beijing, China; Aug. 24, 2015-Aug. 28, 2015 Aug. 23, 2015 (Aug. 23, 2015), XP051001706, Retrieved from the Internet: URL:http://www.3gpp.org/ftp/Meetings_3GPP_SYNC/RAN1/Docs/ [retrieved on Aug. 23, 2015 8 pages.
Panasonic: "DRS Design for LAA," 3GPP Draft; R1-154018, 3rd Generation Partnership Project (3GPP), Mobile Competence Centre ; 650, Route Des Lucioles ; F-06921 Sophia-Antipolis Cedex ; France vol. Ran WG1, No. Beijing, China; Aug. 24, 2015-Aug. 28, 2015 Aug. 23, 2015 (Aug. 23, 2015), XP051039385, Retrieved from the Internet URL:http://www.3gpp.org/ftp/Meetings_3GPP_SYNC/RAN1/Docs/ [retrieved on Aug. 23, 2015], 8 pages.

* cited by examiner

AUTONOMOUS UPLINK TRANSMISSIONS ON A SHARED COMMUNICATION MEDIUM

CROSS-REFERENCE TO RELATED APPLICATIONS

The present Application for Patent claims the benefit of U.S. Provisional Application No. 62/435,604, entitled "AUTONOMOUS UPLINK TRANSMISSIONS ON A SHARED COMMUNICATION MEDIUM", filed Dec. 16, 2016, which is assigned to the assignee hereof and hereby expressly incorporated by reference herein in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may need to coexist with the operations of other Radio Access Technologies (RATs) that typically utilize the same unlicensed bands, most notably IEEE 802.11x WLAN technologies generally referred to as "Wi-Fi."

SUMMARY

An embodiment is directed to a method of operating an access terminal configured to selectively implement autonomous uplink (AUL) transmissions, including monitoring a Discovery Reference Signaling (DRS) Measurement Timing Configuration (DMTC) window of a shared communication medium while refraining from performing any AUL transmissions, and selectively transmitting one or more AUL transmissions based on the monitoring.

Another embodiment is directed to a method of operating an access terminal configured to selectively implement AUL transmissions, including establishing a first Listen Before Talk (LBT) contention window duration for use outside of paging opportunity windows (POWs) and/or DMTC windows of a shared communication medium and a second LBT contention window duration for during the POWs and/or DMTC windows of the shared communication medium, detecting a POW and/or DMTC window, and setting an LBT contention window to the second LBT contention window duration in response to the detecting.

Another embodiment is directed to a method of operating an access terminal configured to selectively implement AUL transmissions, including receiving an AUL disable signal instructing the access terminal to disable AUL transmissions, and refraining from performing one or more AUL transmissions on a shared communication medium in response to the AUL disable signal.

Another embodiment is directed to an access terminal configured to selectively implement AUL transmissions, including at least one processor coupled to at least one transceiver and configured to monitor a DMTC window of a shared communication medium while refraining from performing any AUL transmissions, and selectively transmit one or more AUL transmissions based on the monitoring.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to autonomous uplink transmissions on a shared communication medium.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
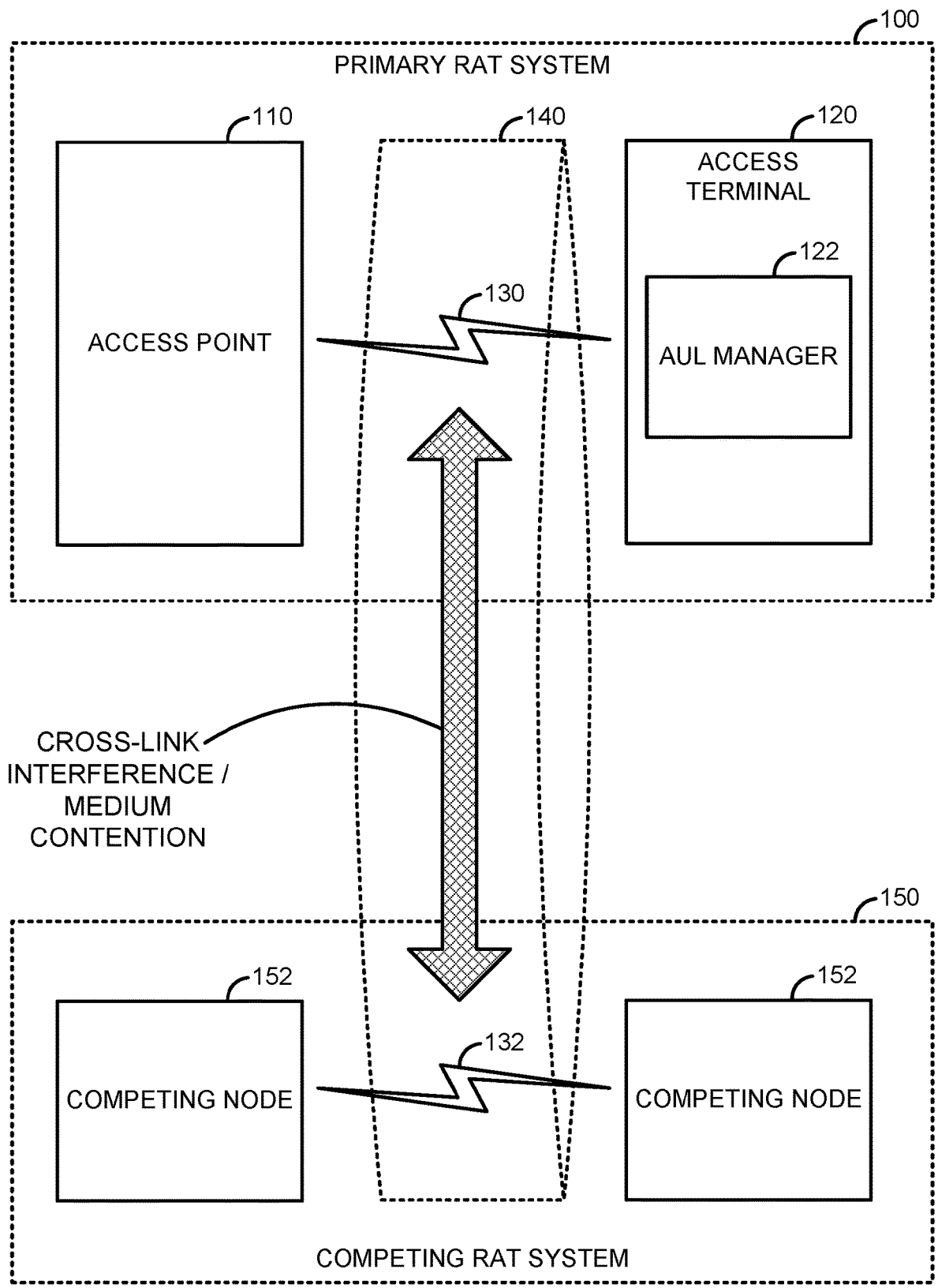
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access terminal 120 may be variously configured in accordance with the teachings herein to provide or otherwise support the AUL transmission techniques discussed briefly above. For example, the access terminal 120 may include an AUL manager 122. The AUL manager 122 may be configured in different ways to manage AUL transmissions by the access terminal 120 on the communication medium 140.

Figure 2:
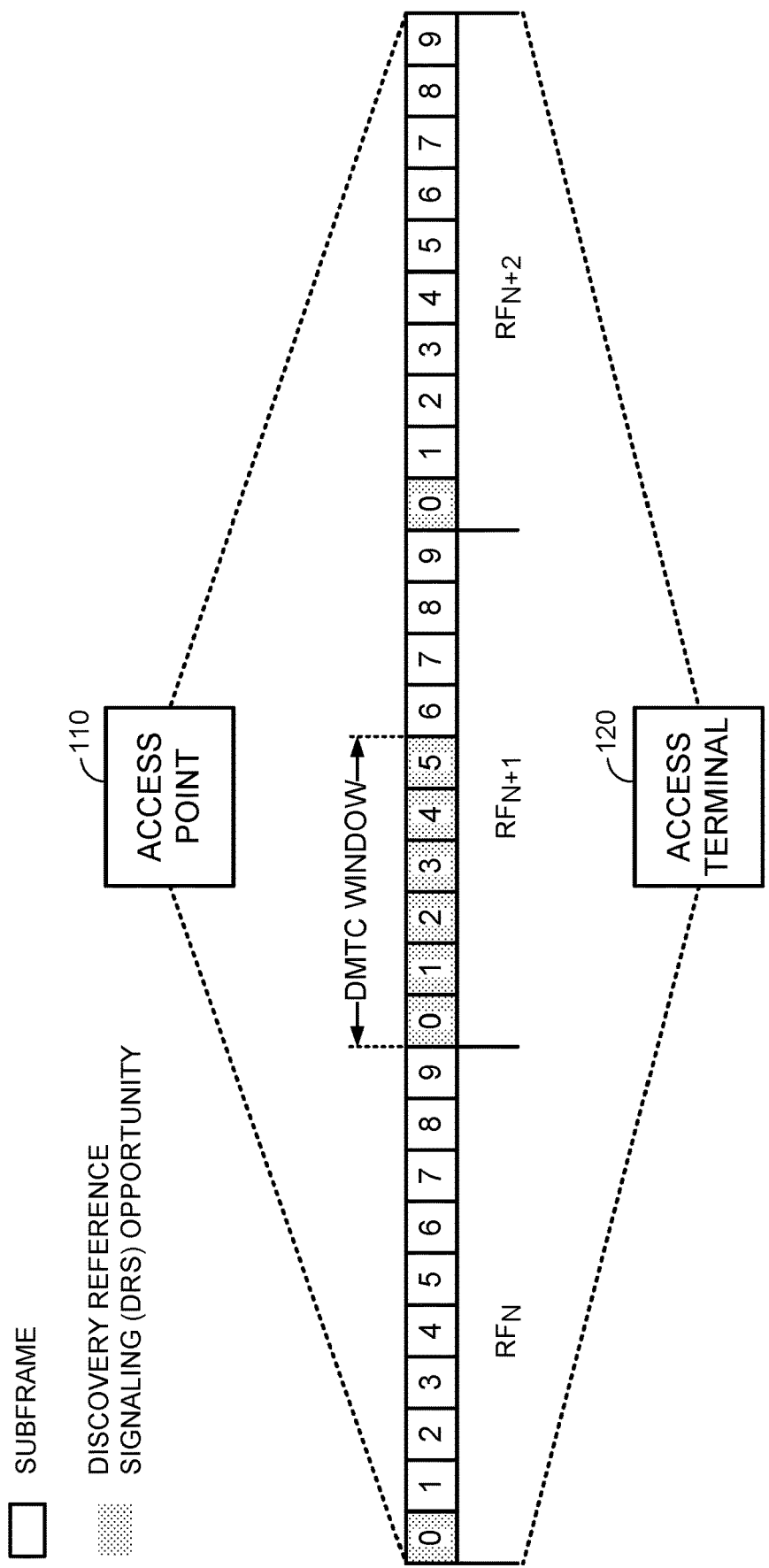
FIG. 2 illustrates an example frame structure.

FIG. 2 illustrates an example frame structure that may be implemented for the primary RAT system 100 on the communication medium 140 to facilitate contention-based access to the communication medium 140.

The illustrated frame structure includes a series of radio frames (RFs) that are numbered in accordance with a system frame number numerology ($RF_N$, $RF_{N+1}$, $RF_{N+2}$, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

In general, the example frame structure of FIG. 2 may be implemented as a Frequency Division Duplex (FDD) frame structure or a Time Division Duplex (TDD) frame structure. In an FDD frame structure, each subframe on a given frequency may be statically configured for uplink (UL) communication for transmitting uplink information from the access terminal 120 to the access point 110 or for downlink (DL) communication for transmitting downlink information from the access point 110 to the access terminal 120. In a TDD frame structure, each subframe may be variously operated at different times as a downlink (D), uplink (U), or special (S) subframe. Different arrangements of downlink, uplink, and special subframes may be referred to as different TDD configurations.

In some designs, the frame structure of FIG. 2 may be "fixed" in that the location of each subframe may be predetermined in relation to an absolute time, but may or may not be occupied by primary RAT signaling in any given instance due to the contention procedure for accessing the communication medium 140. For example, if the access point 110 or the access terminal 120 fails to win contention for a given subframe that subframe may be silenced. In other designs, however, the frame structure of FIG. 2 may be "floating" in that the location of each subframe may be dynamically determined in relation to the point at which access to the communication medium 140 is secured. For example, the start of a given frame (e.g., $RF_{N+1}$) may be delayed in relation to an absolute time until the access point 110 or the access terminal 120 is able to win contention.

As is further illustrated in FIG. 2, one or more subframes may be designated to include what is referred to herein as Discovery Reference Signaling (DRS). The DRS may be configured to convey reference signaling for facilitating system operation. The reference signaling may include information relevant to timing synchronization, system acquisition, interference measurements (e.g., Radio Resource Measurements (RRM)/Radio Link Measurements (RLM)), tracking loops, gain reference (e.g., Automatic Gain Control (AGC)), paging, etc. As an example, the DRS may include a Primary Synchronization Signal (PSS) and a Secondary Synchronization Signal (SSS) for cell searching, a Cell-specific Reference Signal (CRS) for RRM, a Physical Broadcast Channel (PBCH) for conveying various access parameters, and so on. The DRS may be scheduled for transmission periodically (e.g., every 10 ms) in a designated subframe(s) of each radio frame (e.g., subframe SF0) or in a range of such subframes referred to as a DRS Measurement Timing Configuration (DMTC) window defined around a designated subframe (e.g., spanning the first six subframes SF0 to SF5 of the radio frame).

As noted above, at some point during the contention process for a shared communication medium such as the communication medium 140, the shared communication medium becomes clear (e.g., CCA Clear) and the access point 110, for example, seizes it. Conventionally, in order to reserve the communication medium 140 for itself for a Transmission Opportunity (TXOP) having a certain duration (e.g., one radio frame), the access point 110 may send a channel reservation message (RSV) defined for the competing RAT system 150. The channel reservation message may be transmitted over the communication medium 140 (e.g., via a competing-RAT-specific transceiver also belonging to the access point 110) to reserve the communication medium 140 for primary RAT operation. Example channel reservation messages may include, for example, 802.11a Data packets, Clear-to-Send-to-Self (CTS2S) messages, Request-to-Send (RTS) messages, Clear-to-Send (CTS) messages, Physical Layer Convergence Protocol (PLCP) headers (e.g., a legacy signal (L-SIG), a high throughput signal (HT-SIG), or very high throughput signal (VHT-SIG)), and the like for a competing Wi-Fi RAT, or other similar messages defined for other competing RATs of interest. The channel reservation message may include a duration indication (e.g., a Network Allocation Vector (NAV)) corresponding to the duration of the target TXOP for which the access point 110 contended for access.

In a specific example, the shared communication medium 140 may include an uplink data channel referred to as a Physical Uplink Shared Channel (PUSCH). Conventionally, access by access terminals such as the access terminal 120 to the PUSCH is controlled by express grant messages transmitted by the access point 110. In an example, the access point 110 may allocate a subset of the resource elements for the PUSCH to the access terminal 120 via a grant message or the like in a preceding subframe. In a further example, the grant message may further include one or more PUSCH timing parameters that identify a start time (e.g., symbol period) within the subframe for the set of resource elements carrying the PUSCH.

Certain forms of autonomous uplink (AUL) transmission protocols (alternatively referred to as grantless PUSCH) are currently under consideration with respect to shared communication mediums. In contrast to grant-based transmission protocols where uplink transmission times are expressly defined in the grant messages, AUL transmission protocols permit access terminals to independently determine the time at which uplink transmissions are to occur (referred to herein as "AUL transmissions"). Examples of AUL transmission protocols may include any of the following:

- The access terminal 120 initiates an AUL transmission along with an access terminal control channel (e.g., a Physical Uplink Control Channel (PUCCH)) on an uplink of the communication medium 140, or
- The access terminal 120 receives a grant message from the access point 110 that specifies a range of times instead of an actual defined transmission time, and the access terminal 120 ultimately selects when, within the specified range of times, to initiate the AUL transmission.

As will be appreciated, because the access point 110 is not in control of the specific transmission times of the AUL transmissions, collisions may occur between AUL transmissions from access terminals (such as access terminal 120) and downlink transmissions from the access point 110. These collisions would not typically occur in systems that use grant-based uplink transmission scheduling protocols.

DMTC windows (which are discussed briefly above) are downlink transmission windows which contain a DRS at a fairly high probability. For example, DMTC windows may occur at a particular period, such as every 40, 80 or 160 ms. The particular subframe of the DMTC window that includes the DRS may fluctuate and thereby is not known at the access terminals. One reason for this fluctuation or variance of the DRS subframe within the DMTC window is that the access point 110 may need to modify the transmission time of the DRS to account for contention on the communication medium 140. DRS in the DMTC window has a higher priority (or shorter) LBT. In this scenario, it is possible for a collision to occur between the AUL transmission from the access terminal 120 and the DRS from the access point 110, as depicted in FIG. 3.

Figure 3:
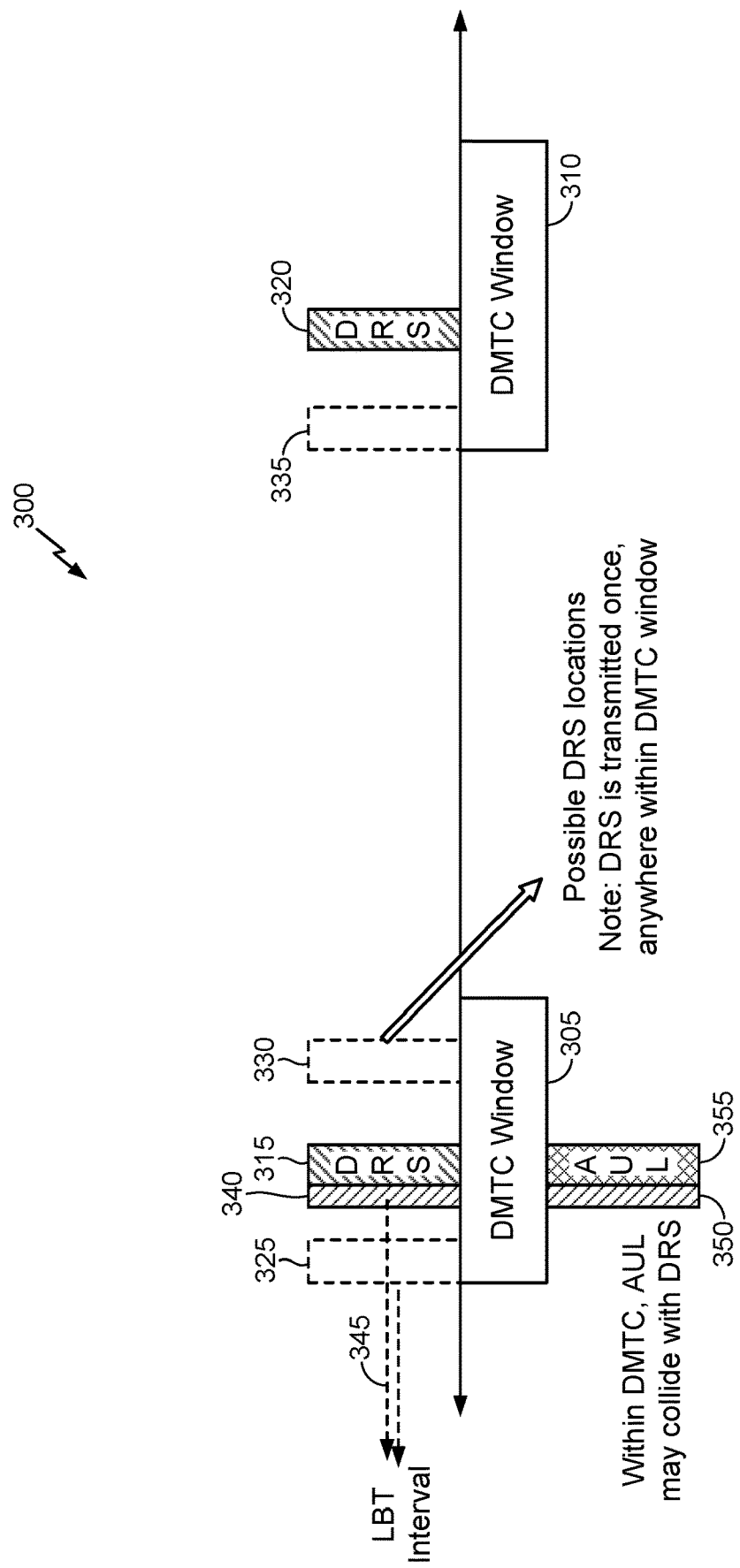
FIG. 3 depicts a transmission sequence on a PUSCH in accordance with an embodiment of the disclosure.

FIG. 3 depicts a transmission sequence 300 on a PUSCH in accordance with an embodiment of the disclosure. Referring to FIG. 3, a series of DMTC windows 305 and 310 are depicted containing DRSs 315 and 320, respectively. As noted above, the DRS subframe can potentially be carried on any subframe of a DMTC window, which is conveyed by the potential DRS locations (or potential DRS subframes) 325, 330 and 335. In FIG. 3, the access point 110 clears the communication medium 140 (e.g., PUSCH) at 340 in LBT interval 345, resulting in transmission of the DRS 315. However, in FIG. 3, the access terminal 120 also clears the communication medium 140 (e.g., PUSCH) to be clear at 350 in LBT interval 345, resulting in an AUL transmission at 355. In this scenario, the AUL transmission at 355 collides with the DRS 315.

Figure 4:
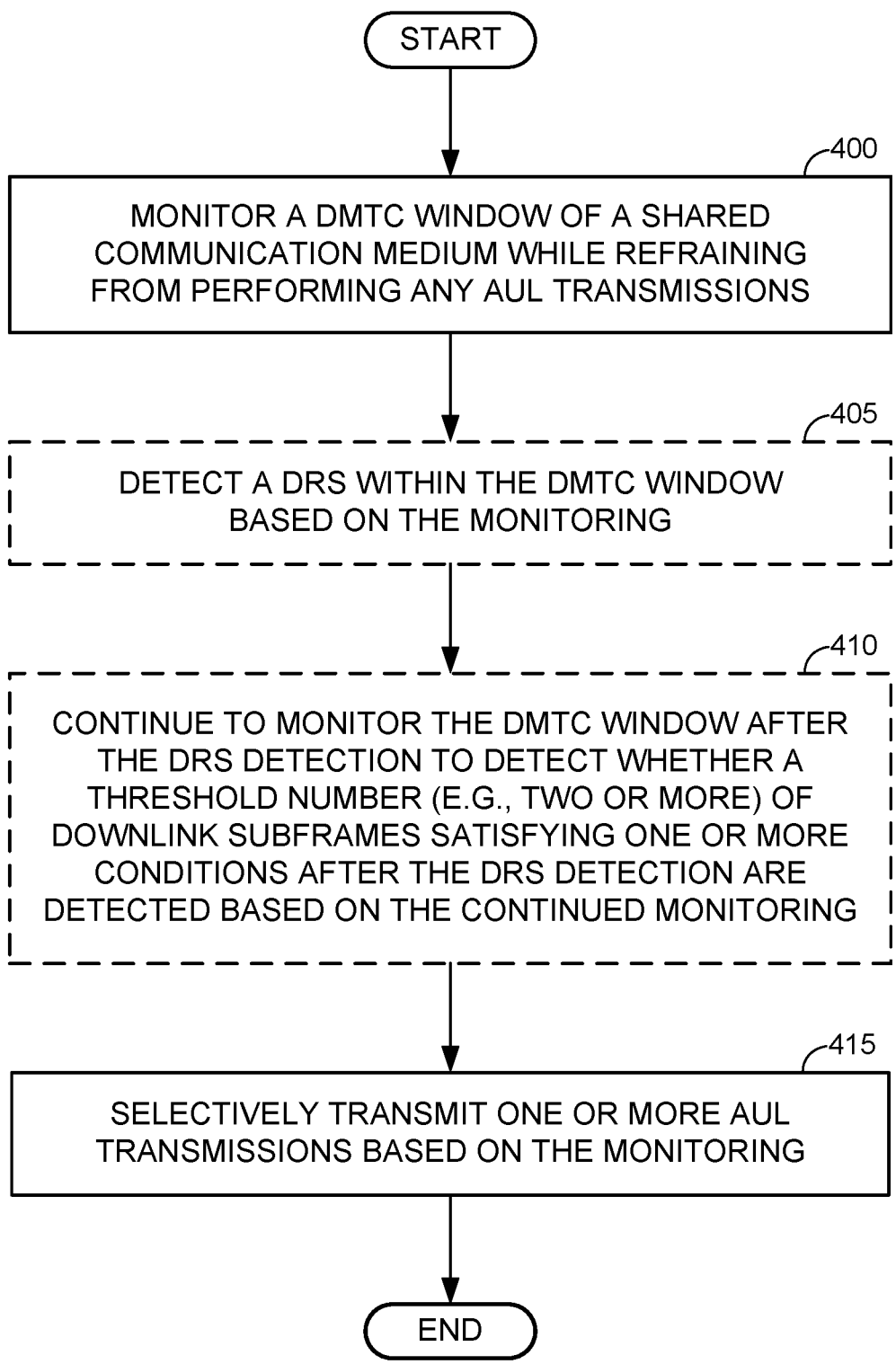
FIG. 4 illustrates a process of selectively performing AUL transmissions in accordance with an embodiment of the disclosure.

FIG. 4 illustrates a process of selectively performing AUL transmissions in accordance with an embodiment of the disclosure. The process of FIG. 4 is performed at an access terminal that is configured with AUL transmission capability (e.g., in an example, less than all deployed access terminals may have such capability), such as the access terminal 120 via operation of the AUL manager 122.

Referring to FIG. 4, at block 400, the access terminal monitors a DMTC window of a shared communication medium (e.g., PUSCH) while refraining from performing any AUL transmissions. By refraining from performing any AUL transmissions during the monitoring of block 400, it will be appreciated that the AUL/DRS collision depicted at 315 and 355 of FIG. 3 can be avoided.

Referring to FIG. 4, at block 405, the access terminal optionally detects a DRS within the DMTC window based on the monitoring from block 400. In an example, even though the access terminal does not know precisely when the DRS will arrive from the access point, the access terminal can monitor the shared communication medium during the DMTC window to facilitate the DRS detection at block 405. In a further example, the DRS detection at block 405 may include PSS/SSS detection within the DMTC window. In a further example, block 405 is optional as the access terminal may monitor the DMTC window without scanning for, or detecting, the DRS.

Referring to FIG. 4, at block 410, the access terminal optionally continues to monitor the DMTC window after the DRS detection to detect whether a threshold number (e.g., two or more) of downlink subframes satisfying one or more conditions after the DRS detection are detected based on the continued monitoring. For example, the one or more conditions may be downlink subframes which are either unused or partially unused (e.g., the access point may transmit a Physical Downlink Control Channel (PDCCH) signal in the subframe while leaving the rest of the subframe unused, which would satisfy this condition). In an example, the optional monitoring of block 410 may be used as a conditional trigger for performing block 415 to ensure that the access point does not re-contend and occupy the shared communication medium before an AUL transmission in a particular subframe is performed.

Referring to FIG. 4, at block 415, the access terminal selectively transmits, in response to the DRS detection of block 405 (and optionally based on the continued monitoring and detection at block 410), one or more AUL transmissions based on the monitoring from block 400. In an example, the one or more AUL transmissions are selectively transmitted in one or more subframes of the DMTC window that occur after the DRS detection. In an alternative example, the one or more AUL transmissions are selectively transmitted outside of the DMTC window. For example, the one or more AUL transmissions may be selectively transmitted after the DMTC window is over irrespective of whether DRS is detected in the DMTC window (e.g., in accordance with an AUL rule that prohibits AUL transmissions during the DMTC window). In an example, block 415 is selective based on a contention protocol (e.g., the one or more AUL transmissions are attempted by the contention protocol and are only performed if the medium can be cleared). In other words, block 415 may eliminate an outright prohibition or restriction on the access terminal performing AUL transmissions, while the access terminal remains subject to other transmission constraints such as compliance with contention-based access to the shared communication medium.

Figure 5:
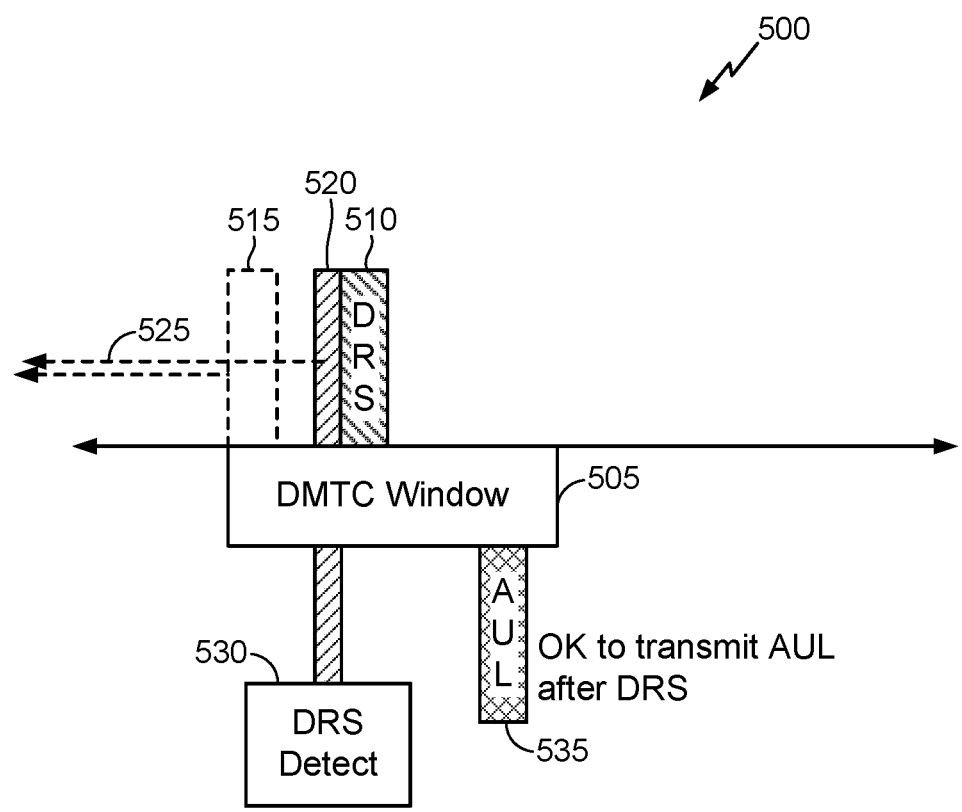
FIG. 5 depicts a transmission sequence on a PUSCH in conjunction with an execution of the process of FIG. 4 in accordance with an embodiment of the disclosure.

FIG. 5 depicts a transmission sequence 500 on a PUSCH in conjunction with an execution of the process of FIG. 4 in accordance with an embodiment of the disclosure. Referring to FIG. 5, a DMTC window 505 is depicted as DRS 510. As noted above, the DRS subframe can potentially be carried on any subframe of a DMTC window, which is conveyed by potential DRS location (or potential DRS subframe) 515. In FIG. 5, the access point 110 clears the communication medium 140 (e.g., PUSCH) at 520 in LBT interval 525, resulting in transmission of the DRS 510. Meanwhile, at block 530, the access terminal detects the DRS 510, after which the access terminal performs AUL transmission(s) at block 535. As noted above, the AUL transmission(s) at block 535 may occur after an optional wait period of two or more subframes with little to no downlink usage and/or contention from the access point.

While FIGS. 4-5 are related to avoiding DRS/AUL collisions based on passive monitoring of the DMTS window (e.g., until the DRS is detected by the access terminal), other embodiments of the disclosure relate to reducing collisions between AUL transmissions and downlink transmissions from the access point via modification to an LBT contention window duration, as will be described below with respect to FIG. 6.

Figure 6:
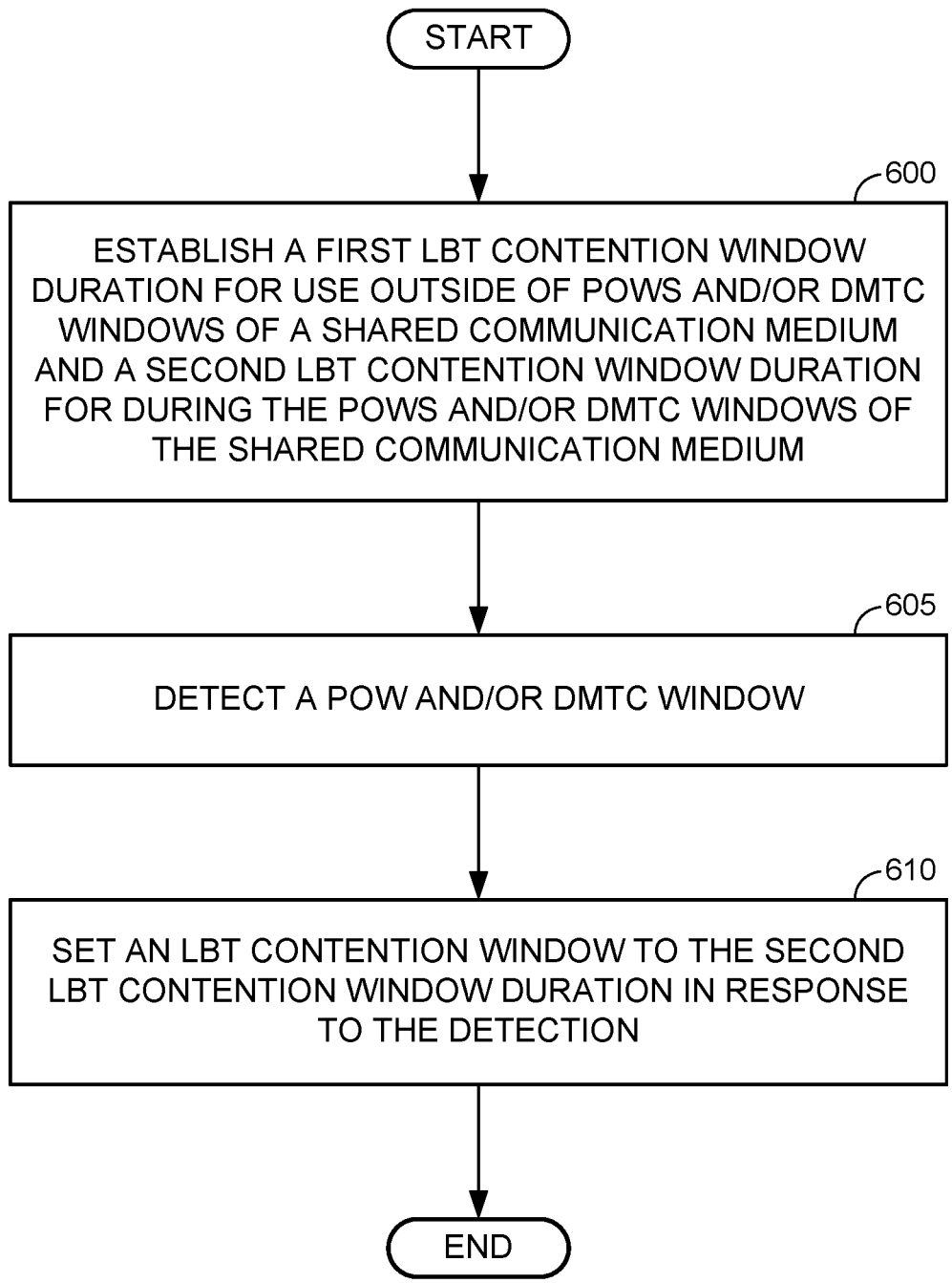
FIG. 6 illustrates a process of selectively performing AUL transmissions in accordance with another embodiment of the disclosure.

FIG. 6 illustrates a process of selectively performing AUL transmissions in accordance with another embodiment of the disclosure. The process of FIG. 6 is performed at an access terminal that is configured with AUL transmission capability (e.g., in an example, less than all deployed access terminals may have such capability), such as the access terminal 120 via operation of the AUL manager 122.

A brief discussion of paging opportunity windows (POWs) will now be provided. A POW is a defined window of time where a paging subframe (i.e., a subframe where the access point seizes the communication medium 140 and transmits a paging message) may potentially occur. Similar to the DRSs described above, the access terminals generally do not know precisely when paging messages will be transmitted within a respective POW. Also, POWs may coincide (or overlap) with DMTC windows in certain implementations. Accordingly, collisions between AUL transmissions and paging messages (or "AUL/PAGE collisions") may occur, similar to the AUL/DRS collisions noted above. The process of FIG. 6 is related to reducing an occurrence of AUL/DRS collisions, AUL/PAGE collisions, or both.

Referring to FIG. 6, at block 600, the access terminal establishes a first LBT contention window duration for outside of POWs and/or DMTC windows of a shared communication medium and a second LBT contention window duration for use during the POWs and/or DMTC windows of the shared communication medium. In contrast to block 600, conventional grant-based transmission protocols typically use a constant LBT contention window duration (or LBT interval), as opposed to separate LBT contention window durations that are dynamically implemented based on POW and/or DMTC window status. As noted above, the second LBT contention window duration may be configured for use during POWs, DMTC windows or both POWs and DMTC windows, including periods where a POW overlaps with a DMTC window. The first LBT contention window duration by contrast is used outside of POWs, DMTC windows, or both POWs and DMTC windows. In other embodiments, different LBT contention window durations can be used during POWs and DMTC windows, or different LBT contention window durations could be used outside of POWs and DMTC windows. Such implementations are encompassed by the process of FIG. 6.

Referring to FIG. 6, at block 605, the access terminal detects a POW and/or DMTC window. In an example, the detection of block 605 may correspond to a recognition that particular subframes are part of a POW and/or DMTC window based on scheduling information for the POW and/or DMTC window conveyed to the access terminal from the access point.

Referring to FIG. 6, at block 610, in response to the detection of block 605, the access terminal sets an LBT contention window to the second LBT contention window duration. In an example, the second LBT contention window duration is lower priority (or longer) than the first LBT contention window duration. This effectively increases the wait-time before the access terminal clears the shared communication medium, which in turn decreases a probability of an AUL/DRS collision, an AUL/PAGE collision, or both. In an example, in the event that the access point wins the shared communication medium and transmits a reservation signal prior to a downlink transmission (e.g., a paging message transmission), the access terminal is unlikely to have cleared the shared communication medium yet and hence will be unlikely to perform a colliding AUL transmission.

Further, within the POW, the access terminal may be required to attempt to read paging subframes for the first X ms before contenting for the shared communication medium in order to perform AUL transmissions. In an example, X ms may be the typical duration within the POW during which a paging message may be transmitted. Accordingly, if the access terminal detects a POW (e.g., at block 605), the access terminal may wait a threshold number of subframes (e.g., corresponding to X ms) at the beginning of the POW to monitor for one or more downlink paging messages. After waiting the threshold number of subframes (or X ms) without any downlink paging messages being detected at the beginning of the POW, the access terminal may then contend for access to the shared communication medium in an attempt to perform one or more AUL transmissions in one or more subframes of the POW.

While FIGS. 4-6 relate to independent action of the access terminal to reduce or eliminate an occurrence of AUL/DRS and/or AUL/PAGE collisions based on self-regulation of AUL transmission behavior at the access terminal, other embodiments of the disclosure relate to signaling by which the access point selectively enables or disables AUL transmissions for one or more access points, as will be described below with respect to FIG. 7. In an example, the selective enabling and/or disabling of AUL transmissions may reduce AUL collisions of various types, including AUL/DRS and AUL/PAGE collisions but also potentially including AUL collisions with other uplink transmissions ("AUL/UL" collisions) or AUL collisions with other types of downlink transmissions aside from DRSs and paging messages.

In a specific AUL/UL collision example, a two-stage transmission grant may be used whereby, at stage 1, an access point grants a particular access terminal resources for a future transmission. Then, at stage 2, a trigger signal is sent at time "T" to enable transmission at time "T+Z" ms, whereby Z is a pseudo-random offset value (e.g., 1 ms, 2 ms, 3 ms, etc.). AUL transmissions may collide with two-stage grant transmissions from other access terminals, and these two-stage AUL/UL collisions may be reduced or eliminated via the process of FIG. 7.

Figure 7:
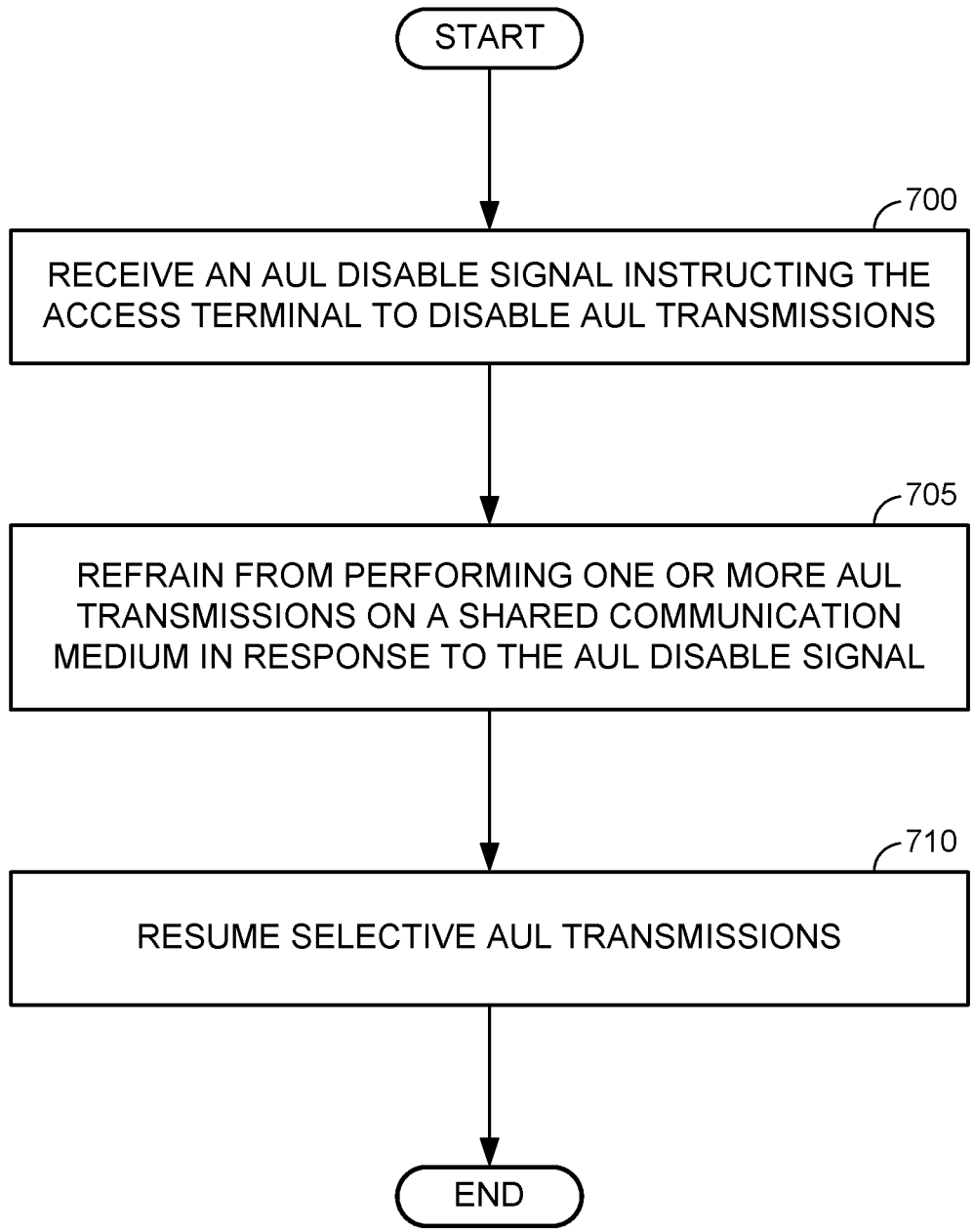
FIG. 7 illustrates a process of selectively performing AUL transmissions in accordance with another embodiment of the disclosure.

FIG. 7 illustrates a process of selectively performing AUL transmissions in accordance with another embodiment of the disclosure. The process of FIG. 7 is performed at an access terminal that is configured with AUL transmission capability (e.g., in an example, less than all deployed access terminals may have such capability), such as the access terminal 120 via operation of the AUL manager 122.

Referring to FIG. 7, at block 700, the access terminal receives an AUL disable signal instructing the access terminal to disable AUL transmissions. In an example, the AUL disable signal may be received from an access point, such as access point 110. In a more specific example, the AUL disable signal may be transmitted by the access point over a Physical Downlink Control Channel (PDCCH). At block 705, the access terminal refrains from performing one or more AUL transmissions on a shared communication medium in response to the AUL disable signal. So, at block 705, irrespective of whether the shared communication medium is being clear, the access terminal will not attempt any AUL transmissions, although the access terminal could still request a formal grant for a TXOP from the access point.

Referring to FIG. 7, at some point after block 705, the access terminal resumes selective AUL transmissions (e.g., based on medium contention, etc.). The resumption of AUL transmissions at block 710 can occur in a variety of ways. In one example, the AUL disable signal may instruct the access terminal to disable all AUL transmissions until an AUL enable signal is transmitted by the access point. In other words, AUL disable signals may be used in conjunction with AUL enable signals to toggle the AUL transmission capability of one or more access terminals between an ON state and an OFF state. In this case, after block 705, the access terminal may wait to receive an AUL enable signal that permits the access terminal to re-enable AUL transmissions, after which the access terminal selectively performs one or more AUL transmissions on the shared communication medium in response to the AUL enable signal (e.g., based on medium contention, etc.) at block 710. In an alternative example, the AUL disable signal may instruct the access terminal to disable all AUL transmissions for a specified period of time (or AUL disable expiration period). In this case, after block 705, the access terminal waits until after the AUL disable expiration period and then selectively performs one or more AUL transmissions on the shared communication medium (e.g., based on medium contention, etc.) at block 710.

Referring to FIG. 7, the AUL disable signal may be access terminal-specific (i.e., a unicast instruction for one particular access terminal to stop AUL transmissions) or cell-specific (e.g., a broadcast message that instructs each access terminal served by a particular cell or access point to stop AUL transmissions). In an example, the access terminal-specific AUL disable signal may be allocated a given number of bits (e.g., 1, 2, etc.) that are mapped to a set of access terminal-specific preconfigured AUL disable periods (e.g., for a 2-bit AUL disable signal, the set of access terminal-specific preconfigured AUL disable periods may include 2, 4, 8 and 16 ms AUL disable periods). Likewise, in another example, the access cell-specific AUL disable signal may be allocated a given number of bits (e.g., 1, 2, etc.) that are mapped to a set of cell-specific preconfigured cell-specific AUL disable periods (e.g., for a 2-bit AUL disable signal, the set of cell-specific preconfigured AUL disable periods may include 2, 4, 8 and 16 ms AUL disable periods).

One example of a cell-specific AUL disable signal is the existing Common PDCCH (C-PDCCH) signal. In certain implementations, the C-DPCCH is transmitted at each subframe of the PDCCH, and includes a certain number of undefined bits. One of these undefined bits can be configured to function as an AUL disable/enable signal (e.g., AUL transmissions enabled if "1" and AUL transmissions disabled if "0", or vice versa). In another example, the cell-specific AUL disable signal may correspond to a proprietary signal that can be sent at a period to be determined by a system operator.

One example of an access terminal-specific AUL disable signal may be a Downlink Control Information (DCI) message. For example, there are a number of existing DCI formats (e.g., 0A, 4A, 0B, 4B, etc.) that include unused or undefined states (or bits), and one of these undefined bits can be configured to function as an AUL disable/enable signal (e.g., AUL transmissions enabled if "1" and AUL transmissions disabled if "0", or vice versa).

In a further example, one or more other of the unused or undefined states of the DCI message may be used to convey other types of information from the access point to a particular access terminal. For example, when one predefined unused or undefined bit mapped to an AUL disable indication is set in the DCI message, another unused or undefined bit (or bits) in the DCI message may be configured to indicate the AUL disable expiration period. In an example, for a single bit implementation, if "0" then disable AUL transmissions for 5 ms, and if "1" then disable AUL transmissions for 5 ms. In another example, for a single bit implementation, if "0" then disable AUL transmissions for 5 ms, and if "1" then disable AUL transmissions indefinitely (e.g., until another DCI message is set with an AUL enable indication via the above-noted predefined unused or undefined bit). It will be appreciated that allocating additional bits to the AUL disable expiration period indication will permit additional AUL disable expiration periods to be specified.

In another example, irrespective of whether the DCI message provides an AUL enable/disable indication, an unused or undefined bit (or bits) in the DCI message may be configured to indicate updated control information from the access point to the access terminal related to one or more subsequent AUL transmissions from the access terminal. For example, the unused or undefined bit(s) in the DCI message can specify a modulation and coding scheme (MCS) to be used for future AUL transmissions, or alternatively can specify other types of channel quality feedback such as a resource allocation, a transmission rank, a Hybrid automatic repeat request (HARQ) process index, a redundancy version or any combination thereof. It will be appreciated that the various unused or undefined bits of the DCI message can be further leveraged to indicate any other type of AUL-related control information so long one or more unused or undefined bits in the DCI message remain available.

In a further example, as noted above, not all deployed access terminals may be capable of AUL transmissions. So, in operation, some access terminals may be AUL-capable, while other legacy access terminals are not AUL-capable (or non-AUL access terminals). In an example, some or all of the embodiments described above with respect to FIGS. 4-7 may be implemented so as to be fully or substantially non-disruptive to the legacy non-AUL access terminals, such that the AUL transmissions and any associated AUL-related signaling need not impact performance on the legacy non-AUL access terminals. Further, the embodiments described above with respect to FIGS. 4-7 may generally be more efficient than simply auto-disabling AUL during DMTC windows and/or POWs. As an example, DMTC windows may occupy up to 25% of total transmission time on the communication medium 140 (e.g., each DMTC window may occupy up to 10 ms as often as every 40 ms), such that AUL transmissions may only be available approximately 75% of the time. The above-noted embodiments described with respect to FIGS. 4-7 each permit AUL transmissions during at least some part of the DMTC windows and/or POWs, such that the over AUL transmission utilization is expected to be higher in these embodiments relative to simply auto-disabling AUL during DMTC windows and/or POWs.

For generality, the access terminal 120 is shown in FIG. 1 only in relevant part as including the AUL manager 122. It will be appreciated, however, that the access terminal 120 may be configured in various ways to provide or otherwise support the AUL transmission techniques discussed herein.

Figure 8:
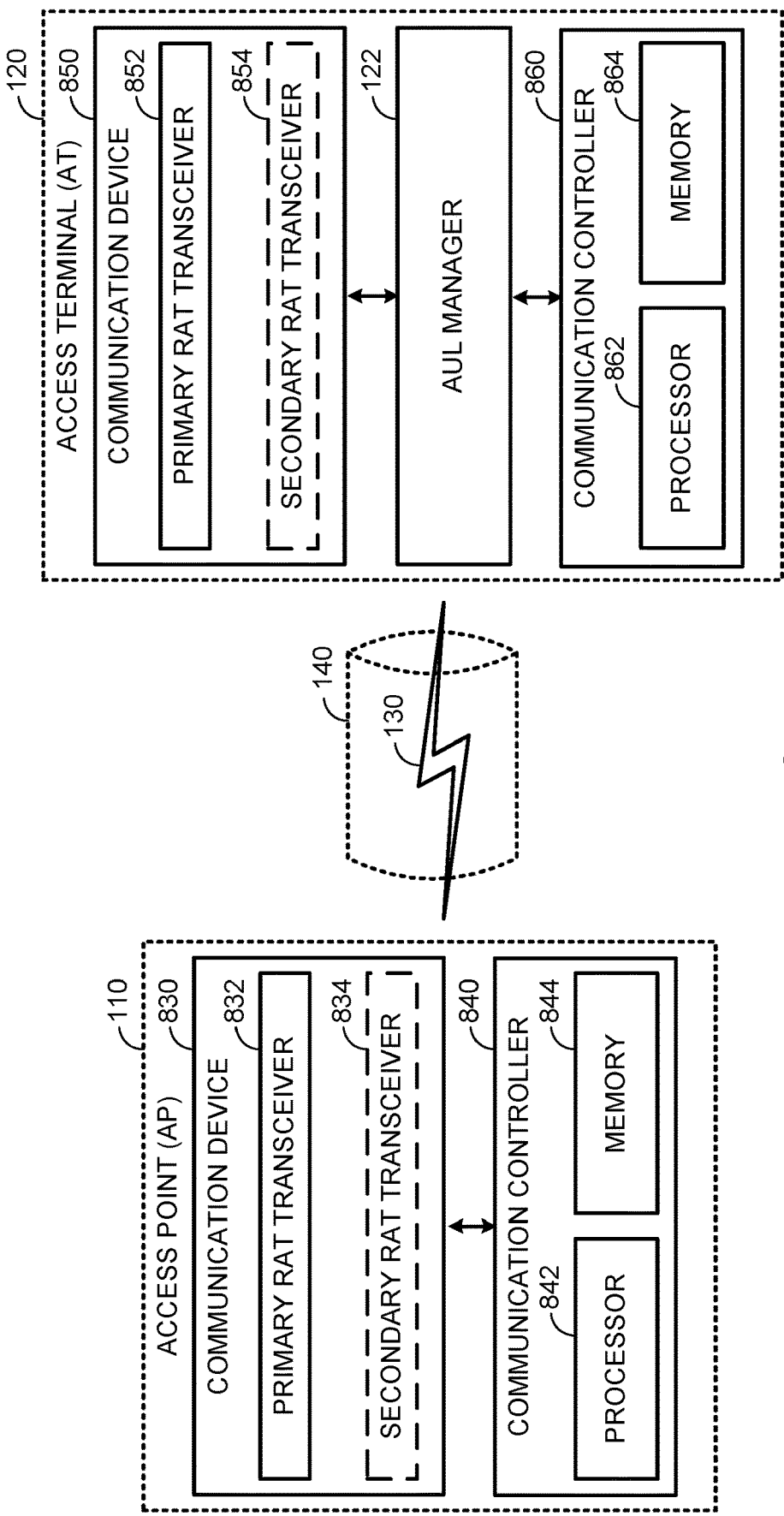
FIG. 8 is a device-level diagram illustrating example components of an access point and an access terminal of the primary RAT system in more detail.

FIG. 8 is a device-level diagram illustrating example components of the access point 110 and the access terminal 120 of the primary RAT system 100 in more detail. As shown, the access point 110 and the access terminal 120 may each generally include a wireless communication device (represented by the communication devices 830 and 850) for communicating with other wireless nodes via at least one designated RAT. The communication devices 830 and 850 may be variously configured for transmitting and encoding signals, and, conversely, for receiving and decoding signals in accordance with the designated RAT (e.g., messages, indications, information, pilots, and so on).

The communication devices 830 and 850 may include, for example, one or more transceivers, such as respective primary RAT transceivers 832 and 852, and, in some designs, (optional) co-located secondary RAT transceivers 834 and 854, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 840 and 860) for controlling operation of their respective communication devices 830 and 850 (e.g., directing, modifying, enabling, disabling, etc.). The communication controllers 840 and 860 may include one or more processors 842 and 862, and one or more memories 844 and 864 coupled to the processors 842 and 862, respectively. The memories 844 and 864 may be configured to store data, instructions, or a combination thereof, either as on-board cache memory, as separate components, a combination, etc. The processors 842 and 862 and the memories 844 and 864 may be standalone communication components or may be part of the respective host system functionality of the access point 110 and the access terminal 120.

It will be appreciated that the AUL manager 122 may be implemented in different ways. In some designs, some or all of the functionality associated therewith may be implemented by or otherwise at the direction of at least one processor (e.g., one or more of the processors 862), at least one memory (e.g., one or more of the memories 864), at least one transceiver (e.g., one or more of the transceivers 852 and 854), or a combination thereof. In other designs, some or all of the functionality associated therewith may be implemented as a series of interrelated functional modules. Accordingly, it will be appreciated that the components in FIG. 8 may be used to perform operations described above with respect to FIGS. 1-7.

Figure 9:
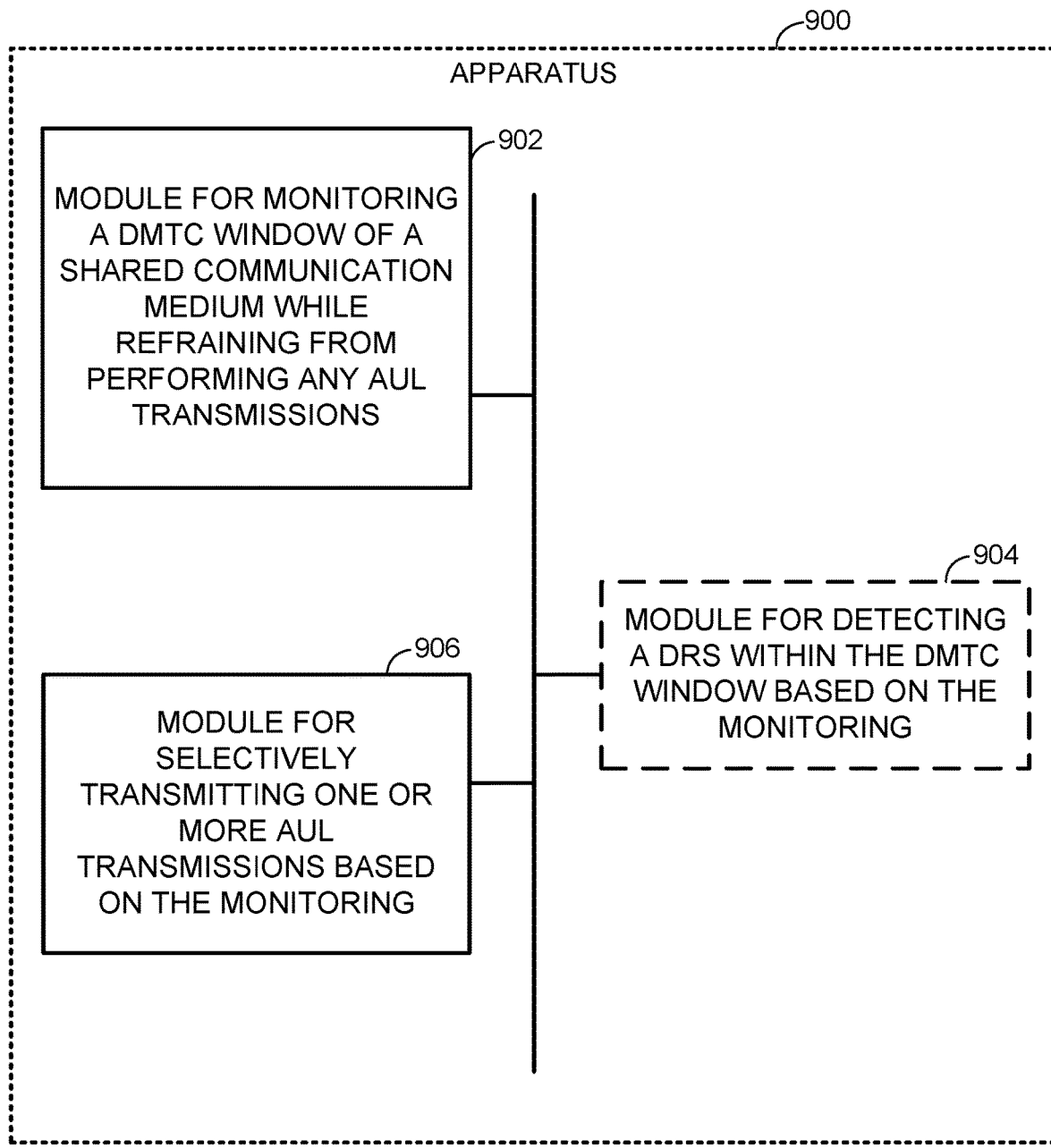
FIG. 9 illustrates an example access terminal apparatus for implementing the AUL manager represented as a series of interrelated functional modules.

FIG. 9 illustrates an example access terminal apparatus 900 for implementing the AUL manager 122 represented as a series of interrelated functional modules. In the illustrated example, the apparatus 900 includes a module for monitoring 902, an optional module for detecting 904, and a module for selectively transmitting 906.

The module for monitoring 902 may be configured to monitor a DMTC window of a shared communication medium while refraining from performing any AUL transmissions. The optional module for detecting 904 may be configured to detect a DRS within the DMTC window based on the monitoring. The module for selectively transmitting 906 may be configured to selectively transmit one or more AUL transmissions based on the monitoring of the DMTC window. In an example, the module for selectively transmitting 906 may be configured to selectively transmit the one or more AUL transmissions in response to the DRS detection in one or more subframes of the DMTC window that occur after the DRS detection.

Figure 10:
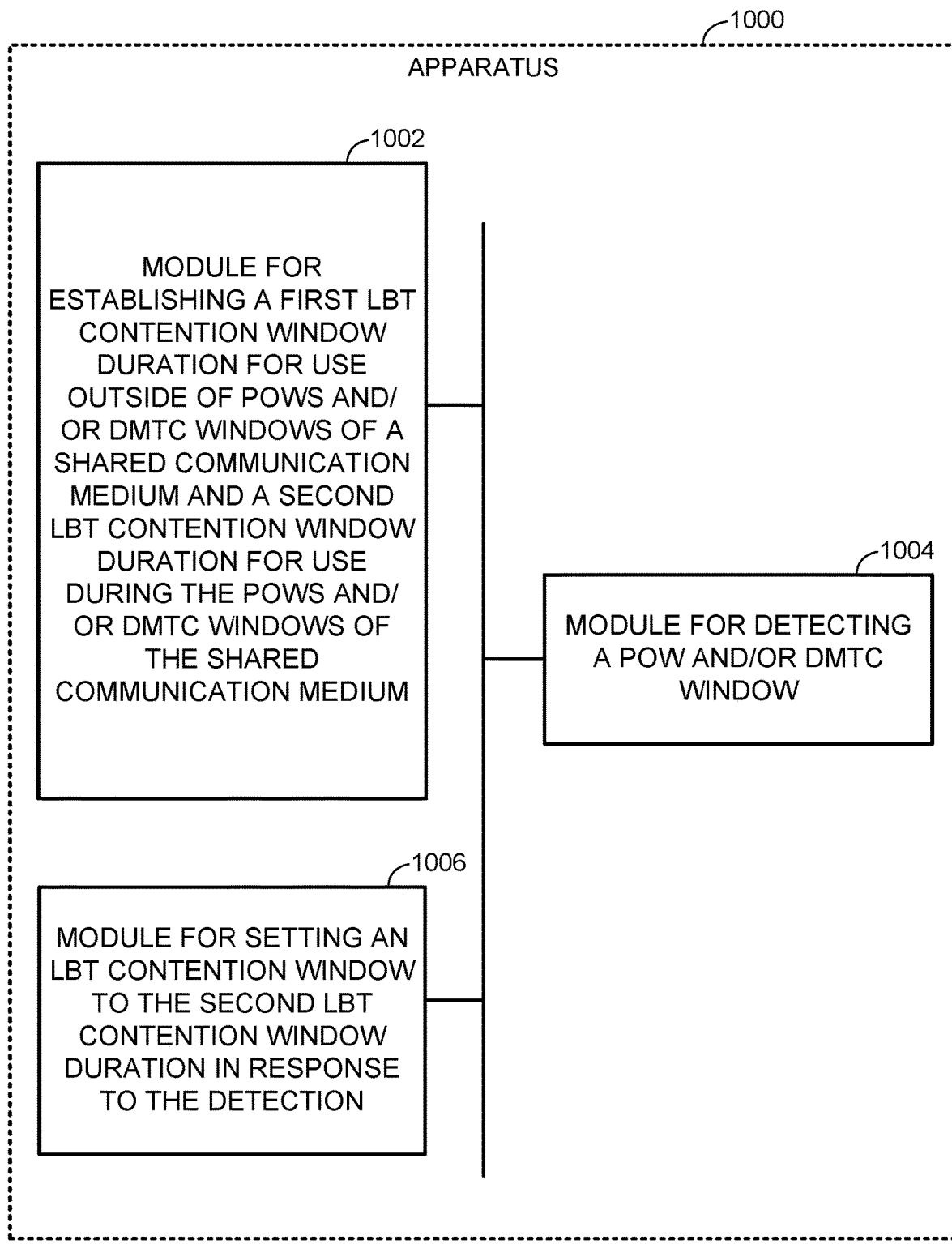
FIG. 10 illustrates another example access terminal apparatus for implementing the AUL manager represented as a series of interrelated functional modules.

FIG. 10 illustrates an example access terminal apparatus 1000 for implementing the AUL manager 122 represented as a series of interrelated functional modules. In the illustrated example, the apparatus 1000 includes a module for establishing 1002, a module for detecting 1004, and a module for setting 1006.

The module for establishing 1002 may be configured to establish a first LBT contention window duration for use outside of POWs and/or DMTC windows of a shared communication medium and a second LBT contention window duration for use during the POWs and/or DMTC windows of the shared communication medium. The module for detecting 1004 may be configured to detect a POW and/or DMTC window. The module for setting 1006 may be configured to set an LBT contention window to the second LBT contention window duration in response to the detection.

Figure 11:
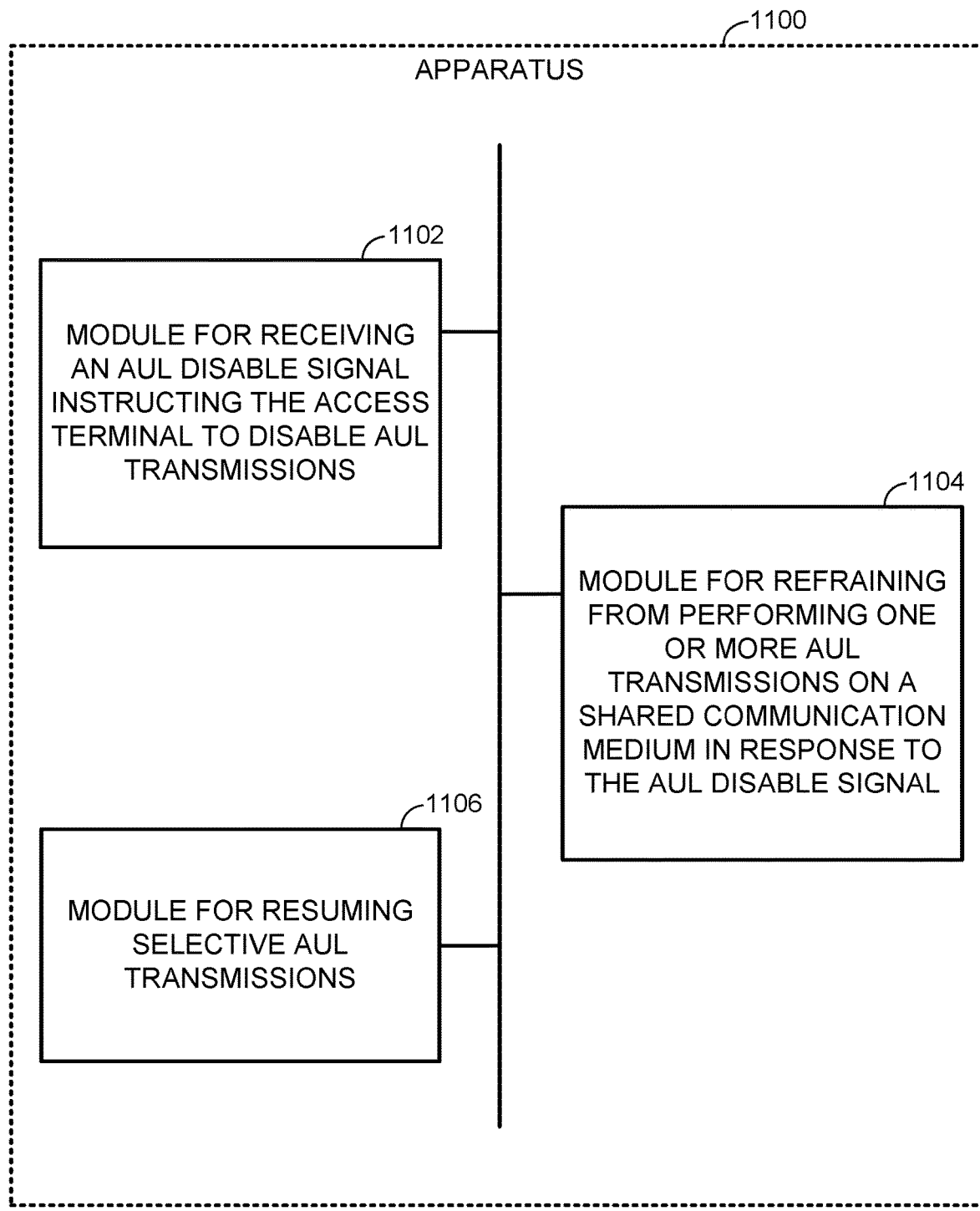
FIG. 11 illustrates another example access terminal apparatus for implementing the AUL manager represented as a series of interrelated functional modules.

FIG. 11 illustrates an example access terminal apparatus 1100 for implementing the AUL manager 122 represented as a series of interrelated functional modules. In the illustrated example, the apparatus 1100 includes a module for receiving 1102, a module for refraining 1104, and a module for resuming 1006.

The module for receiving 1102 may be configured to receive an AUL disable signal instructing the access terminal to disable AUL transmissions. The module for refraining 1104 may be configured to refrain from performing one or more AUL transmissions on a shared communication medium in response to the AUL disable signal. The module for resuming 1106 may be configured to resume selective AUL transmissions.

The functionality of the modules of FIGS. 9-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 9-11, as well as other components and functions described herein, may be implemented using any suitable means. Such means also may be implemented, at least in part, using corresponding structure as taught herein. For example, the components described above in conjunction with the "module for" components of FIGS. 9-11 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 9-11 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating an access terminal configured to selectively implement autonomous uplink (AUL) transmissions, comprising:

monitoring, by the access terminal, a Discovery Reference Signaling (DRS) Measurement Timing Configuration (DMTC) window of a shared communication medium while being prohibited from contending for the shared communication medium for performing any AUL transmission irrespective of a level of traffic activity detected on the shared communication medium;

determining, based on the monitoring, that the prohibition is removed; and selectively transmitting, by the access terminal, one or more AUL transmissions by contending for the shared communication medium after the prohibition is removed based on the determining.

2. The method of claim 1, wherein the one or more AUL transmissions occur in one or more subframes of the DMTC window.

3. The method of claim 1, wherein the one or more AUL transmissions occur outside of the DMTC window.

4. The method of claim 1, further comprising:

detecting DRS within the DMTC window based on the monitoring, wherein the selectively transmitting transmits the one or more AUL transmissions in one or more subframes of the DMTC window in response to the DRS detection.

5. The method of claim 4, wherein the one or more subframes of the DMTC window occur after the DRS detection.

6. The method of claim 4, further comprising:

continuing to monitor the DMTC window after the DRS detection, wherein the selectively transmitting transmits the one or more AUL transmissions after the prohibition is removed in response to a threshold number of downlink subframes within the DMTC window satisfying one or more conditions after the DRS detection are detected based on the continued monitoring.

7. The method of claim 6, wherein the one or more conditions for each downlink subframe that counts toward the threshold number of downlink subframes includes:

the downlink subframe being unused, or the downlink subframe being partially unused.

8. The method of claim 7, wherein a given partially unused downlink subframe among the threshold number of downlink subframes includes a Physical Downlink Control Channel (PDCCH) signal, with a remainder of the given partially unused downlink subframe being unused.

9. The method of claim 1, wherein the selectively transmitting attempts to perform the one or more AUL transmissions based on a contention protocol.

10. The method of claim 1, wherein the selectively transmitting is based upon a collision avoidance scheme that is configured to reduce collisions between the one or more AUL transmissions from the access terminal and one or more downlink transmissions from a base station.

11. A method of operating an access terminal configured to selectively implement autonomous uplink (AUL) transmissions, comprising:

establishing a first Listen Before Talk (LBT) contention window duration for use outside of paging opportunity windows (POWs) and/or Discovery Reference Signaling (DRS) Measurement Timing Configuration (DMTC) windows of a shared communication medium and a second LBT contention window duration for use during the POWs and/or the DMTC windows of the shared communication medium;

detecting, by the access terminal, a POW and/or a DMTC window; and setting, by the access terminal, an LBT contention window for uplink transmission attempts by the access terminal on the shared communication medium to the second LBT contention window duration in response to the detecting.

12. The method of claim 11, wherein the first LBT contention window duration is longer than the second LBT contention window duration.

13. The method of claim 11,
wherein the detecting detects a POW, further comprising:
waiting a threshold number of subframes at the beginning of the POW to monitor for one or more downlink paging messages; and
selectively transmitting, if no downlink paging messages are detected within the threshold number of subframes at the beginning of the POW, one or more AUL transmissions in one or more subframes of the POW.

14. The method of claim 11, wherein the detecting detects the POW and/or the DMTC window occurs based on scheduling information for the POW and/or the DMTC window that is conveyed to the access terminal from an access point.

15. A method of operating an access terminal configured to selectively implement autonomous uplink (AUL) transmissions, comprising:
receiving, by the access terminal, an AUL disable signal instructing the access terminal to disable AUL transmissions on a shared communication medium as part of a collision avoidance scheme; and
refraining, by the access terminal, from performing one or more AUL transmissions on the shared communication medium in response to the AUL disable signal,
wherein the AUL disable signal is cell-specific.

16. The method of claim 15, further comprising:
receiving an AUL enable signal permitting the access terminal to re-enable AUL transmissions; and
selectively performing one or more AUL transmissions on the shared communication medium in response to the AUL enable signal.

17. The method of claim 15, wherein the AUL disable signal specifies an AUL disable expiration period, further comprising:
waiting until after the AUL disable expiration period and then selectively performing one or more AUL transmissions on the shared communication medium.

18. The method of claim 15, wherein the AUL disable signal indicates one of a set of pre-configured AUL disable periods.

19. The method of claim 15, wherein the cell-specific AUL disable signal corresponds to a Common Physical Downlink Control Channel (C-PDCCH) signal or a proprietary signal.

20. The method of claim 15, wherein the refraining refrains from performing the one or more AUL transmissions during at least part of and less than all of a paging opportunity window (POW) and/or a Discovery Reference Signaling (DRS) Measurement Timing Configuration (DMTC) window of the shared communication medium.

21. The method of claim 15, wherein the collision avoidance scheme is configured to reduce collisions between an AUL transmission from the access terminal and one or more downlink transmissions from a base station.

22. The method of claim 15, wherein the collision avoidance scheme is configured to reduce collisions between at least one AUL transmission from the access terminal and at least one downlink transmission from a base station.

23. An access terminal configured to selectively implement autonomous uplink (AUL) transmissions, comprising:
at least one processor coupled to at least one transceiver and configured to:
monitor a Discovery Reference Signaling (DRS) Measurement Timing Configuration (DMTC) window of a shared communication medium while being prohibited from contending for the shared communication medium for performing any AUL transmission irrespective of a level of traffic activity detected on the shared communication medium;
determine, based on the monitoring, that the prohibition is removed; and
selectively transmit one or more AUL transmissions by contending for the shared communication medium after the prohibition is removed based on the determination.

24. The access terminal of claim 23,
wherein the one or more AUL transmissions occur in one or more subframes of the DMTC window, or
wherein the one or more AUL transmissions occur outside of the DMTC window.

25. The access terminal of claim 23,
wherein the at least one processor further configured to detect DRS within the DMTC window based on the monitoring,
wherein the at least one processor further configured to selectively transmit the one or more AUL transmissions in one or more subframes of the DMTC window in response to the DRS detection.

26. The access terminal of claim 25, wherein the one or more subframes of the DMTC window occur after the DRS detection.

27. The access terminal of claim 25,
wherein the at least one processor further configured to continue to monitor the DMTC window after the DRS detection,
wherein the at least one processor further configured to selectively transmit the one or more AUL transmissions in response to a threshold number of downlink subframes within the DMTC window satisfying one or more conditions after the DRS detection are detected based on the continued monitoring.

28. The access terminal of claim 23, wherein the at least one processor further configured to selectively transmit the one or more AUL transmissions by attempting to perform the one or more AUL transmissions based on a contention protocol.

* * * * *